SUPERIMPOSE AN INSULATOR LAYER 2 ON A LAYER 1

LIGHT

APPLY AN OPPOSITE POLARITY OF CHARGE

LIGHT

APPLY AN OPPOSITE POLARITY OF CHARGE

CHARGE BY THE REVERSE CHARGING REMAINS

LIGHT

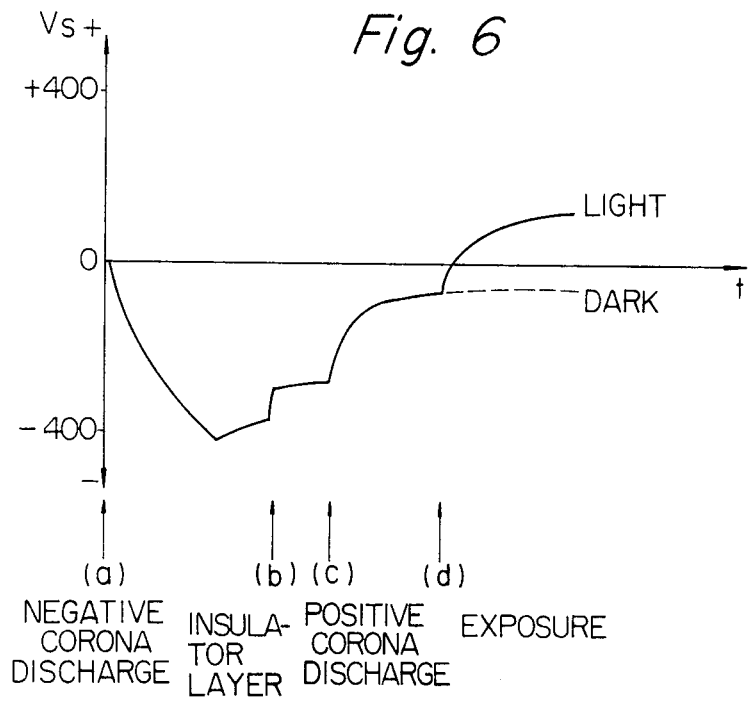
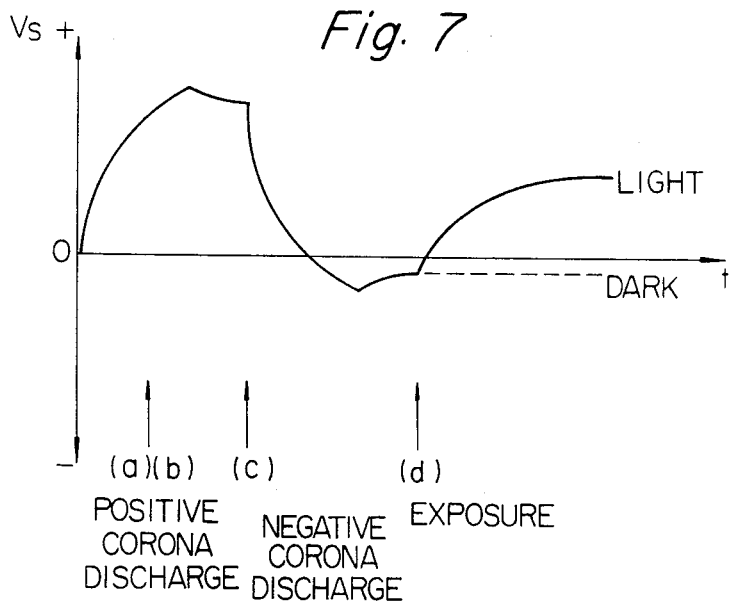

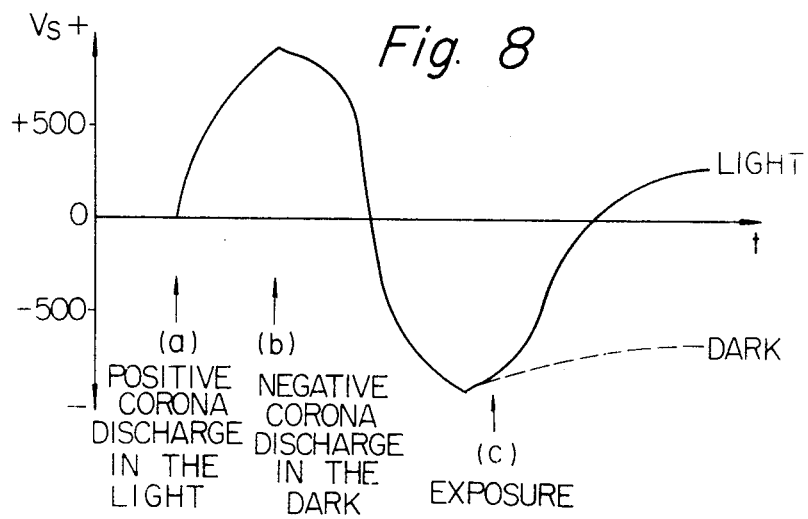
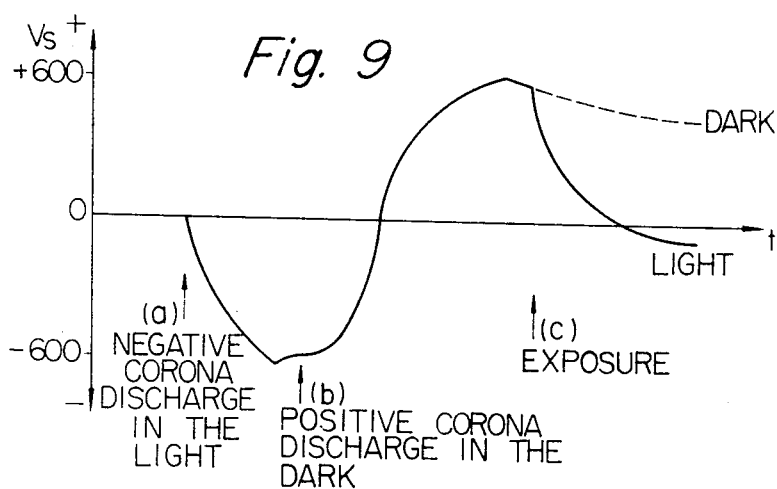
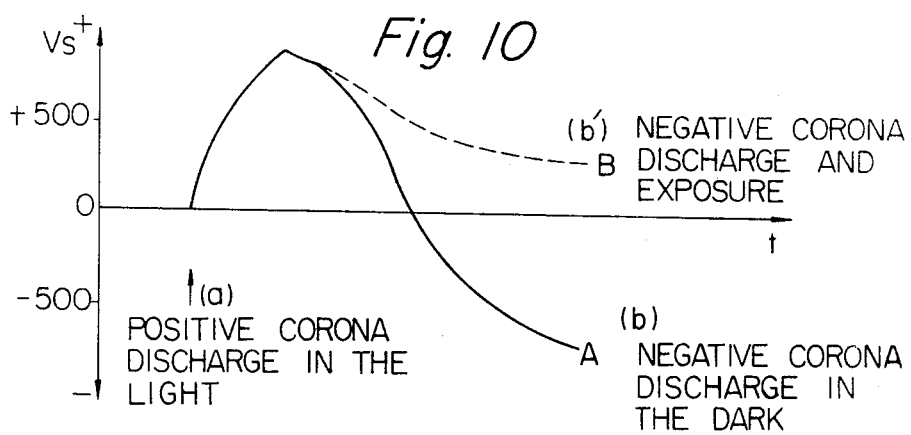

United States Patent Office 3,677,751
Patented July 18, 1972

3,677,751
POLARITY REVERSAL ELECTROPHOTOGRAPHY
Wasaburo Ohta, Yokohama-shi, and Katsuo Sakai, Ebina-machi, Japan, assignors to Kabushiki Kaisha Ricoh, Tokyo, Japan
Filed Nov. 14, 1969, Ser. No. 876,952
Claims priority, application Japan, Nov. 30, 1968, 43/87,891
Int. Cl. G03g 13/22
U.S. Cl. 96—1 R
2 Claims

ABSTRACT OF THE DISCLOSURE

An electrophotography method wherein a photosensitive layer is charged up in the dark, the photosensitive layer being overcoated by an insulator layer, and a charge of the polarity opposite to that of the initial charge is applied on the insulator layer in a quantity less than that of the initial charge, and thereafter, the electric polarity at the spots corresponding to the light and dark spots of an original is reversed by an image light projection.

---

The present invention relates to a novel electrophotography wherein the change of capacitance and the change of charge quantity on a photosensitive layer due to a light projection are combined to reverse the polarity of the surface potential.

Figure 1:
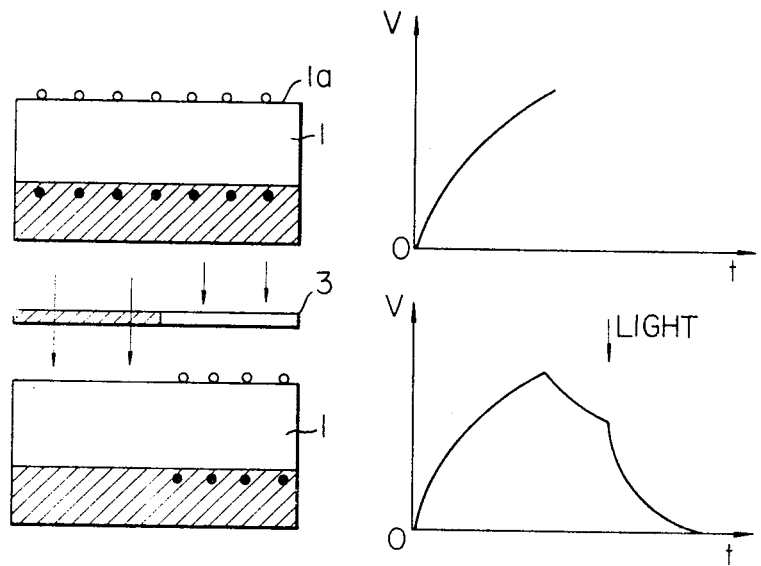
Figure 2:
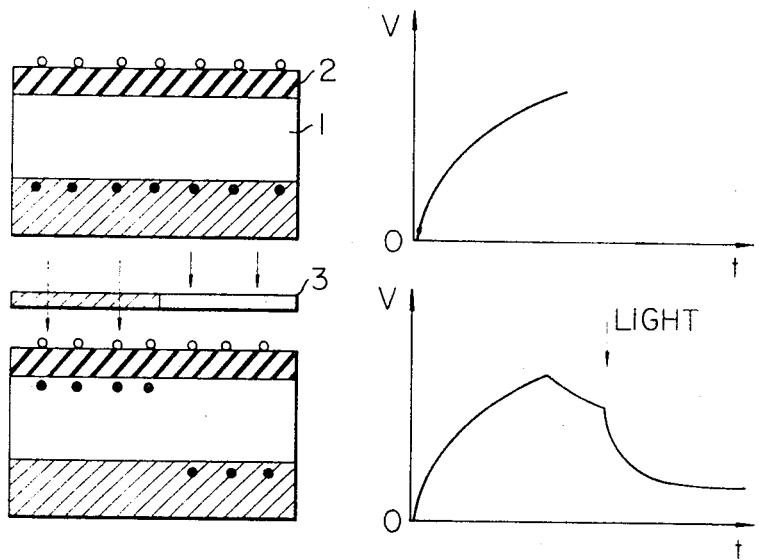
Figure 3A:
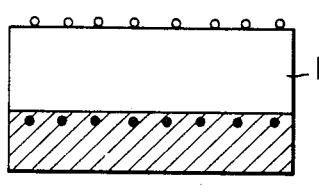
Figure 3A:
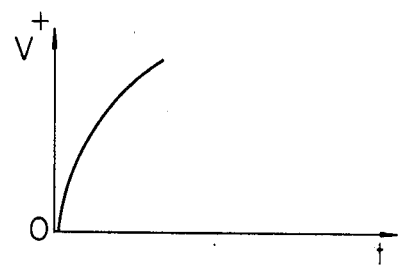
Figure 3B:
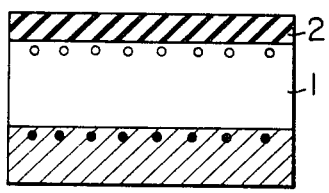
Figure 3B:
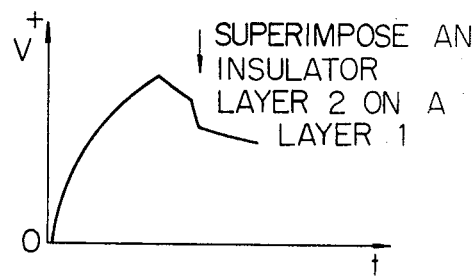
Figure 3C:
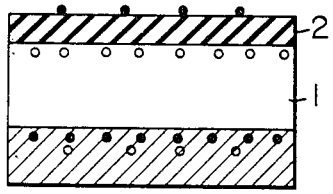
Figure 3C:
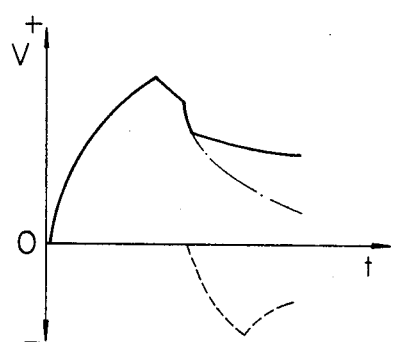
Figure 3D:
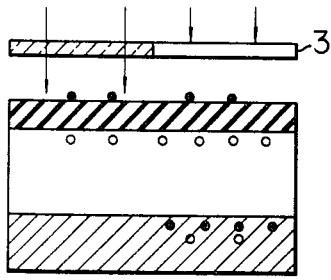
Figure 3D:
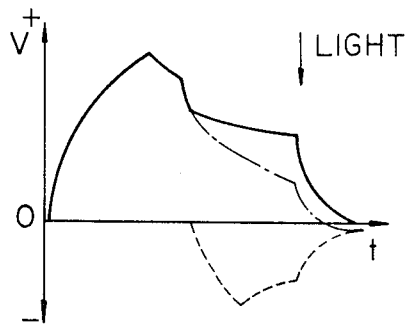
Figure 4A:
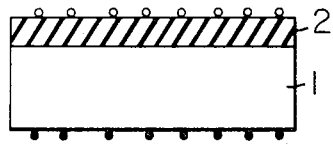
Figure 4A:
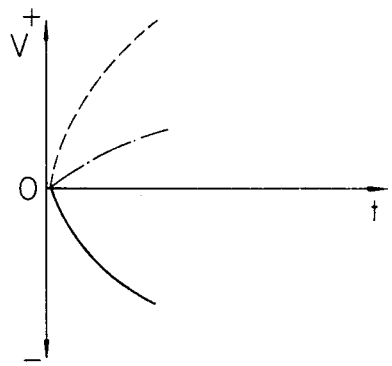
Figure 4B:
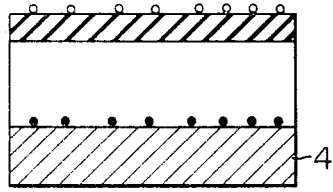
Figure 4C:
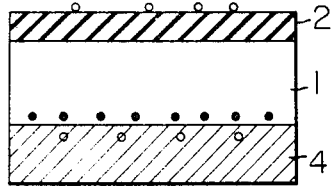
Figure 4C:
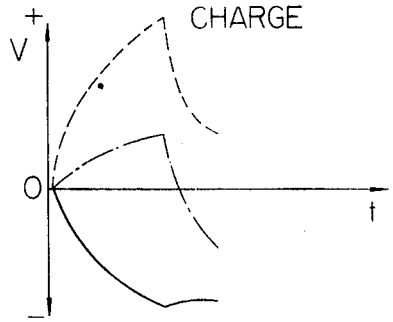
Figure 4D:
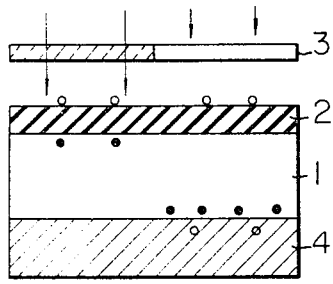
Figure 4D:
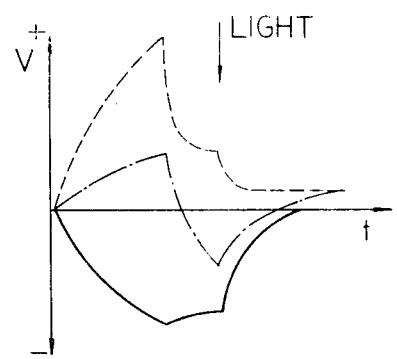
Figure 5A:
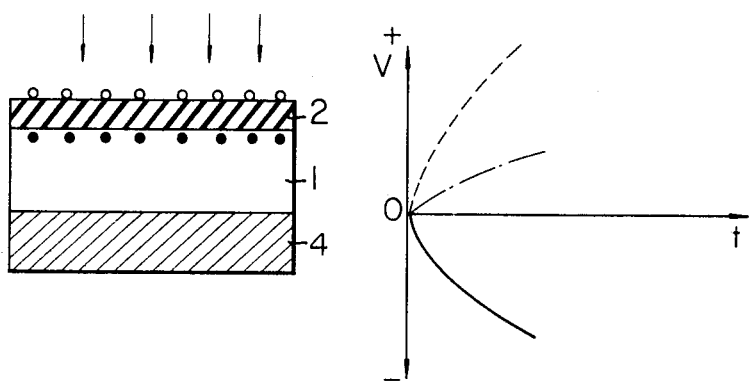
Figure 5B:
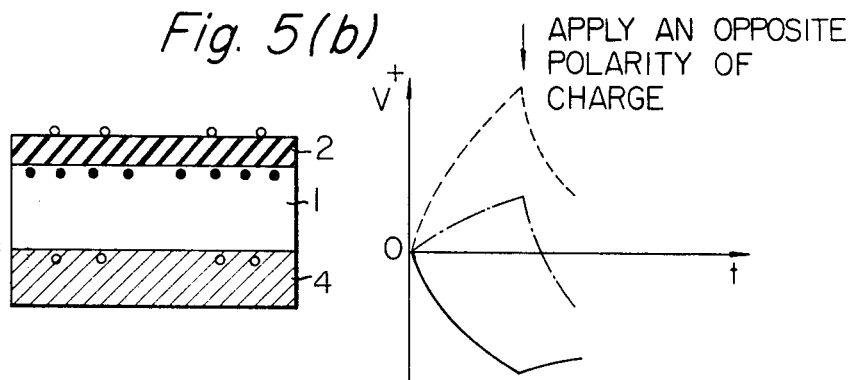
Figure 5C:
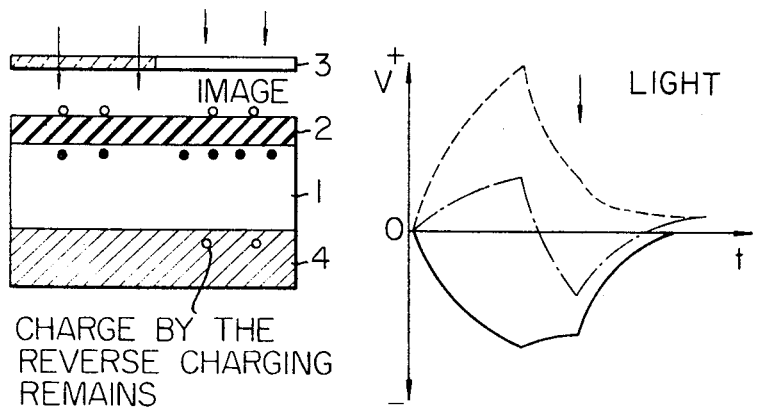

For a better understanding of the invention, reference is made to the following detailed disclosure taken in conjunction with the accompanying drawings wherein:

FIGS. 1 and 2 denote the processes and the time variations of surface potential in two prior electrophotographic methods;

FIGS. 3 to 5 denote various processes and the time variations of surface potential in order to explain the method according to the present invention; and FIGS. 6 to 10 denote the time variations of surface potential in various processes according to the present invention.

In conventional electrophotography, there exist two methods for forming electrostatic latent images on principle. One is the so-called Carlson method and the other, the capacitive image method. In the Carlson method, as shown in FIG. 1, charges (denoted small blank dots o) uniformly applied on the surface 1a of a photosensitive layer 1 decrease owing to the change of resistance of the photosensitive layer 1 by a light proejction, the surface potential, as the result, goes down, and this is utilized to form an electrostatic latent image. In other words, the surface charge is proportional to the surface potential.

In the capacitive image method, as shown in FIG. 2, a charge uniformly applied to the surface of an insulator layer 2 does not change, but the capacitance of a photosensitive layer 1 increases due to a light projection. As a result, the surface potential goes down and an electrostatic latent image is formed on the photosensitive layer 1. In other words, the surface charge density is constant while the surface potential is inversely proportional to the capacitance of the photosensitive layer 1. In each of these methods, the surface potential is changed due to the light projection under one polarity and the polarity of the surface potential is never reversed. Here, the reference 3 denotes an original plate.

The object of the present invention is to provide a novel electrophotography in which both of the prior methods are combined and the polarity of the surface potential is reversed by a light projection.

FIG. 3 denotes the simplest process according to the invention, wherein:

(a) An electrostatic charge is applied to a photosensitive layer 1 in the dark;

(b) The photosensitive layer 1 is overcoated by a transparent insulator layer 2 in the dark;

(c) A charge of the polarity opposite to that of the initial charge is applied to the insulator layer 2 a little less than the initial charge; and (d) The photosensitive layer 1 is exposed to light. As a result, the change of the surface potential owing to the change of the resistance (shown by a solid line) overlaps with the change of the surface potential owing to the change of the capacitance (shown by a broken line) and the polarity is reversed (shown by a one-dot broken line).

As it is a difficult technique to overcoat the photosensitive layer 1 with the transparent insulator layer 2, it is improved in the following way. In FIG. 4:

(a) A photosensitive plate comprising a transparent insulator layer 2 and a photosensitive layer 1 is doubly charged in the dark;

(b) The photosensitive layer 1 is put upon an electrode 4;

(c) A charge of the polarity opposite to that of the initial charge is applied to the transparent insulator layer 2 in the dark a little less than the initial charge; and (d) The transparent insulator layer 2 is exposed to light. As a result, the change of the surface potential due to the change of the resistance (shown by a solid line) overlaps with the change of the surface potential due to the change of the capacitance (shown by a broken line) and the polarity is reversed (shown by a one-dot broken line).

However, since a charge is applied between the photosensitive layer and the electrode in this method unlike the initial method wherein a charge is applied between the photosensitive layer and the insulator layer, the photosensitive plate is unstable and the decay rate in the dark is very large. Therefore, the method is improved so that the charge invading the photosensitive layer from the electrode is applied between the photosensitive layer and the insulator layer. In FIG. 5:

(a) In a photosensitive plate comprising a transparent insulator layer 2, a photosensitive layer 1 and an electrode 4, a corona discharge is effected on the insulator layer side simultaneously with a light projection, and a charge is stored between the photosensitive layer 1 and the insulator layer 2. It is not desirable to trap the above-mentioned charge in the photosensitive layer, because it causes a preexposure fatigue of the photosensitive layer and the sensitivity of the photosensitive layer 2 decreases.

(b) A charge whose polarity is opposite to that of the initial charge is applied to the transparent insulator layer 2 in the dark a little less than the initial charge;

(c) The transparent insulator layer 2 is exposed to light. As the result, the change of the surface potential owing to the change of the resistance (shown by a solid line) overlaps with the change of the surface potential owing to the change of the capacitance (shown by a broken line) and the polarity is reversed (shown by a one-dot broken line).

In this method, it is not necessary to separate the photosensitive plate, and the photosensitive plate is stable because the charge is applied between the photosensitive layer and the insulator layer. So this method is one of the best methods.

The followings are detailed explanations of the above-mentioned three processes referring to the attached drawings.

EXAMPLE 1 (FIG. 6)

A zinc oxide and a resin binder are mixed in the ratio of 5 to 1 by weight, and are dissolved in toluene. This photosensitive solution is painted as a layer 20 microns in thickness on a sheet of conductively processed base paper.

(a) The photosensitive layer thus processed is charged up negatively by a corona discharge. The surface potential at this time is —410 volts.

(b) The photosensitive layer is overcoated by a polyester film of 6 microns in thickness. The surface potential goes up to —310 volts.

(c) The insulator layer of the polyester film is charged up positively by a corona discharge. The surface potential goes up further to —60 volts.

(d) The insulator layer is exposed to a 30 luxes/sec. light. The surface potential at this time is +70 volts.

An image light is projected to the sheet and the sheet is developed with a liquid developer. Then an image with little smudging in the background can be obtained.

EXAMPLE 2 (FIG. 7)

The above-mentioned photosensitive solution is applied as a layer of about 20 microns thick onto a polyester film of 6 microns in thickness.

(a) Both sides of the photosensitive plate thus processed are charged up in polarities opposite to each other, namely, doubly charged, by a corona discharge in the dark.

(b) An electrode is overcoated by the photosensitive layer. The surface potential at this time is +700 volts.

(c) The insulator layer is charged up negatively by a corona discharge. The surface potential goes down to —100 volts.

(d) The insulator layer is exposed to a 50 luxes/sec. light. The surface potential at this time is +400 volts.

In this process, also, an image of high contrast with less smudging in the background can be obtained.

EXAMPLE 3 (FIG. 8)

A zinc oxide and a resin binder is mixed in the ratio of 5 to 1 by weight. A dye sensitizer is added thereto. The mixture is solved in toluene, and sufficiently dispersed in a homo-mixer. The photosensitive solution is painted as a layer of about 50 microns thick on an aluminum plate of 0.5 millimeter in thickness and dried. A polyester film of 4 microns in thickness is applied to the plate. Thus a photosensitive plate is prepared.

(a) The insulator layer is charged up positively by a corona discharge along with a simultaneous light projection. A negative charge is stored between the photosensitive layer and the insulator layer. The surface potential at this time is +900 volts.

(b) The insulator layer is charged up negatively by a corona discharge in the dark. The surface potential at this time becomes —900 volts.

(c) The insulator layer is exposed to a 260 luxes/sec. light. The surface potential then goes up to +330 volts.

Further, almost the same result can be obtained even if in the process (a) the light is projected after the corona discharge or the corona discharge is effected after the light projection, instead of the simultaneous steps of the light projection and the corona discharge.

Furthermore, the polarity of the surface potential can be reversed by a light projection as well even if the surface is charged up negatively in the process (a) and positively in the process (b).

EXAMPLE 4 (FIG. 9)

A selenium plate is used in the process of Example 3. A selenium layer of 100 microns in thickness is evaporated upon an aluminum plate of 0.5 millimeter in thickness, and a photosensitive plate is formed by overcoating it with a polyester film of 4 microns thick.

(a) The above-mentioned insulator layer is charged up negatively by a corona discharge along with a simultaneous light projection. A positive charge is stored between the photosensitive layer and the insulator layer. The surface potential at this time is —600 volts.

(b) The insulator layer is charged up positively by a corona discharge in the dark. The surface potential then goes up to +600 volts.

(c) The insulator layer is exposed to a 260 luxes/sec. light. The surface potential goes down to —50 volts. Thus the same effect can be obtained in the case a selenium layer is used as a photosensitive layer.

EXAMPLE 5 (FIG. 10)

In the above-mentioned Example 3 wherein the photosensitive plate is charged with the opposite polarity simultaneously with an image light projection, two photosensitive plates A and B the composition of which is the same as that of the photosensitive plate used in Example 3 are prepared.

(a) The insulator layers of both photosensitive plates A and B are charged up positively by a corona discharge. In each of the photosensitive plates A and B, a negative charge is stored between the photosensitive layer and the insulator layer. The surface potential at this time is +900 volts.

(b) The insulator layer of the photosensitive plate A is charged up negatively by a corona discharge in the dark. The surface potential goes down to —800 volts.

(b') The insulator layer of the photosensitive plate B is charged up negatively by a corona discharge simultaneously with a 100 lux light projection for 25 seconds. The surface potential at this time is +350 volts.

In other words, the same polarity reversal effect can be obtained even if a light is projected onto the photosensitive plate simultaneously with charging it in the opposite polarity.

Every discretion should be used in type and voltage of a corona discharge source (charger) when the photosensitive plate is charged up in the opposite polarity. The corona discharge source should be designed so that the surface of the insulator layer may be charged up uniformly even when the capacitance of the photosensitive layer is changed by a light projection. Otherwise, this effect mentioned above is weakened, and sometimes a negative electrostatic latent image may be formed from a positive original image. It is the object and the characteristic feature of the present invention to form a positive electrostatic latent image from a positive original image.

What is claimed is:

1. A polarity reversal electrophotographic method comprising the steps of:
   placing a first charge of one polarity on a photo conductive layer in the dark by corona discharge,
   overcoating said photo conductive layer with a transparent insulating layer in the dark,
   charging said insulating layer in the dark by a corona discharge with a charge of opposite polarity and of smaller magnitude to that of said first charge, and
   image exposing said photo conductive layer, whereby the polarity of surface potential of the light exposed portion is reversed.

2. A polarity reversal electrophotographic method using a photosensitive plate for electrophotography which compirses an electrode, a transparent insulating layer, and a photo conductive layer therebetween, comprising the steps of:
  placing a first charge of one polarity on the insulating layer by corona discharge while simultaneously uniformly projecting light thereon so that a charge of opposite polarity is stored between the insulating layer and photo conductive layer,
  applying a second charge in the dark to said transparent insulator layer by a corona discharge, said second charge being of opposite polarity and of smaller magnitude to that of said first charge, and
  image exposing said transparent insulator layer.

References Cited

UNITED STATES PATENTS

| | | | |
|---|---|---|---|
| 3,041,167 | 6/1962 | Blankney et al. | 355—17 X |
| 3,268,331 | 8/1966 | Harper | 355—17 X |
| 3,429,701 | 2/1969 | Koehler | 355—17 X |
| 3,457,070 | 7/1969 | Watanabe et al. | 96—1 R X |

SAMUEL S. MATTHEWS, Primary Examiner

F. L. BRAUN, Assistant Examiner

U.S. Cl. X.R.

355—17